United States Patent Office 3,590,080
Patented June 29, 1971

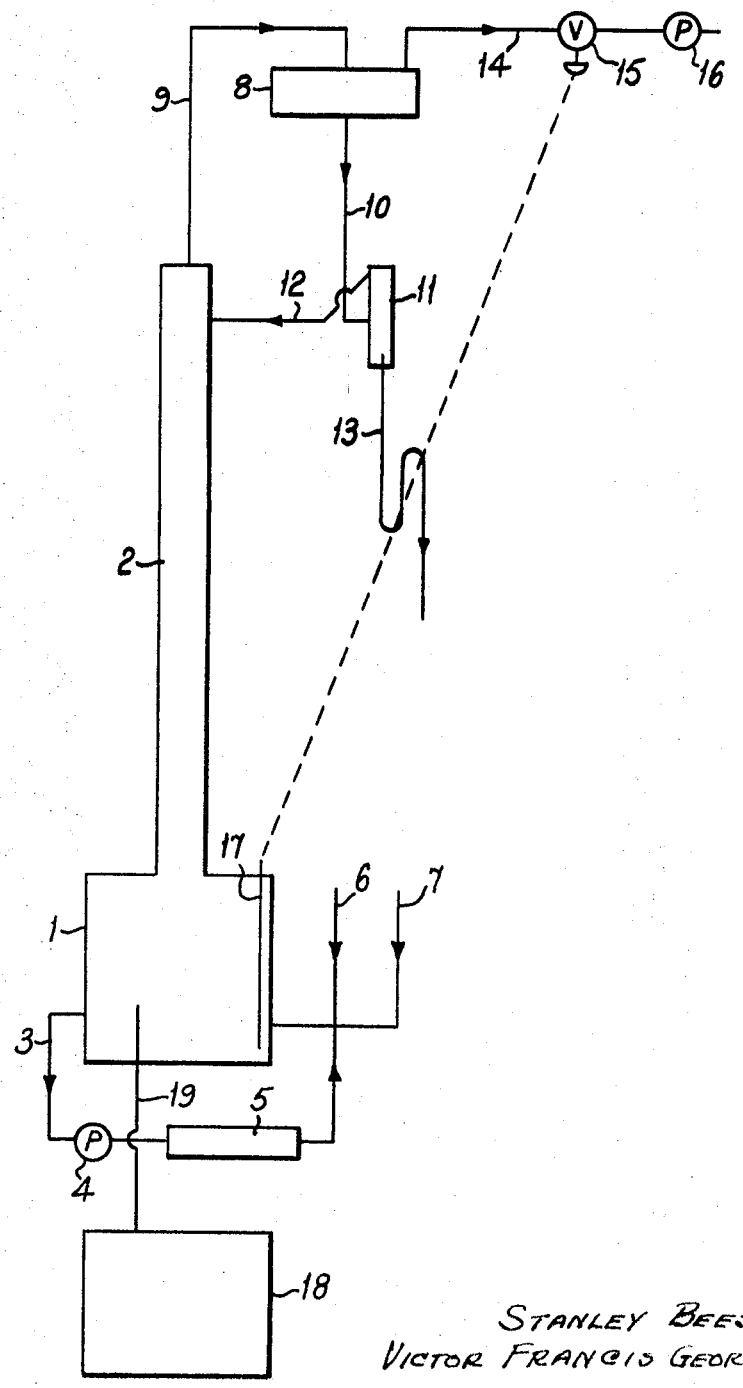

---

3,590,080
MANUFACTURE OF ω-HYDROXY ACIDS
Stanley Beesley and Victor Francis George Cooke, Duffield, Derby, England, assignors to Courtaulds Limited, London, England
Filed Oct. 17, 1966, Ser. No. 587,310
Claims priority, application Great Britain, Oct. 20, 1965, 44,364/65; Nov. 22, 1965, 49,538/65; Mar. 4, 1966, 9,507/66; Apr. 22, 1966, 17,659/66
Int. Cl. C07c 59/04
U.S. Cl. 260—535
7 Claims

ABSTRACT OF THE DISCLOSURE

The process for making ω-hydroxy carboxylic acids by the peroxide oxidation of cyclic ketones using a solution of free polybasic acid catalysts.

---

This invention concerns improvements in the Baeyer-Villiger oxidation of alicyclic ketones to α,ω-hydroxy acids and esterified derivatives thereof, including lactones and polyesters.

This Baeyer-Villiger reaction, insofar as it concerns ubsubstituted alicyclic ketones, is summarised in the following equation:

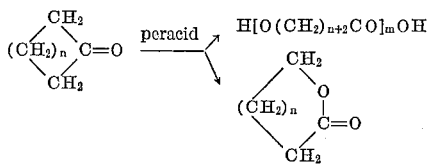

in which $m$ and $n$ are integers, the reaction having been proved at least for values of $n$ between 1 and 14. The linear product, $H[O(CH_2)_{n+2}CO]_mOH$, denotes the simple hydroxyacid when $m$ is 1 and a polyester when $m$ is greater than 1.

The peracids which have previously been employed include both organic peracids, for example peracetic, perbenzoic, monoperphthalic and permaleic acids, and inorganic peracids, for example permon- and perdisulphuric acids. Inevitably, the spent reaction mixture contains, in addition to the main product, the acid residue of the peracid and in a proportion of more than one mole per mole of α,ω-hydroxy acid, even under the most favourable conditions. Further, the peracid cannot generally be reformed from the acid residue as cheaply as it can from other materials; for example the oxidation of acetaldehyde to peracetic acid is cheaper than any route starting from acetic acid. A commercial application of the classical Baeyer-Villiger reaction would, therefore, suffer from an embarrassing accumulation of a by-product which cannot economically be recycled in the process.

The generally agreed mechanism of the reaction, due to Criegee, is set out on p. 75 of "Organic Reactions" volume 9, published by Wiley in 1957. An essential intermediate in the reaction is the 1-hydroxy perester shown in the following equation:

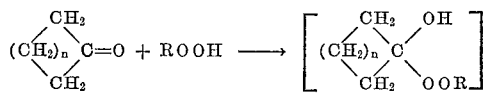

where ROOH is the peracid.

The parent 1-hydroxyhydroperoxide of this perester can be prepared by reacting the ketone with hydrogen peroxide or the corresponding alcohol with molecular oxygen according to the equations:

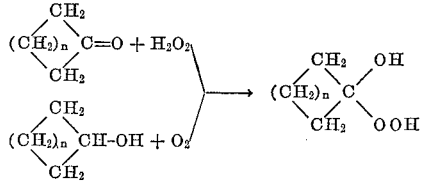

In practice the product of the process is an equilibrium mixture of the 1-hydroxyhydroperoxide and its condensed derivatives, including:

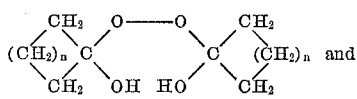

The mixture derived from the oxidation of cyclohexanol was described by Brown et alia in J.A.C.S., volume 77, pages 1756–9.

The mixture of peroxides made in this way is capable of rearranging under the influence of heat and optionally in the presence of an acid catalyst, in the same way as the derivative perester intermediate of the Baeyer-Villiger reaction, yielding the α,ω-hydroxy acid and its derivatives. The yields, hitherto, have only been in the range of 20 to 40 percent based on the peroxide, but at least the process does not produce an embarrasing by-product— in this case, the residue of the reduced peroxide is itself a ketone which can be recycled in the process by reaction with hydrogen peroxide or by reduction to the alcohol and conversion to the peroxide by reaction with molecular oxygen. Heteropolybasic acids and their salts have been advocated as suitable catalysts, and inert solvents, including aqueous solutions of the ketonic precursor of the peroxides, have been employed as media for the rearrangement.

We have found that it is possible to operate the Baeyer-Villiger reaction to obtain excellent yields, frequently in excess of 70 percent molar, of the α,ω-hydroxy acids and derivatives, based on the peroxide, without incurring an embarrassing by-product.

According to the present invention a process for the manufacture of an α,ω-hydroxy acid and esterified derivatives thereof comprises heating to at least 80° C. a substantially anhydrous solution of a peroxide and a free heteropolybasic acid catalyst in an excess of an alicyclic ketone.

The process is generally applicable to the oxidation of alicyclic ketones and particularly to cyclobutanone, cyclopentanone, cyclohexanone and cycloheptanone to produce, respectively, 4-hydroxybutyric acid, 5-hydroxyvaleric acid, 6-hydroxycapoic acid, 7-hydroxyenanthic acid and/or the esterified derivatives, lactones and polyesters, of each acid.

A heteropolybasic acid has a complex anion formed by the union of one of the acid anhydrides $WO_3$, $MoO_3$ and $V_2O_5$ with an acid, the anion of which supplies the central atom of the complex anion. The ability to act as the central atom in polyacids is shared not only by the acid-forming elements, but also among the metals of the transition series. For example the elements having this ability include Cu, Be, Zn, B, Ac, C, Si, Ge, Sn, Ti, Zr, Ce, Th, N, P, As, Sb, V, Nb, Ta, Cr, Mo, W, V, S, Se, Te, Mn, I, Fe, Co, Ni, Rh, Os, Ir, Pt and thus elements from Group 1 to Group 8 of the Periodic Table are represented.

A variety of types of heteropolybasic acids may be formed which vary in the ratio of the central atom to the complexing anhydride, the anionic formulae of several tungsten-containing species is set out in the following table.

| Number of atoms X:W | Principal central atoms ($X^{n+}$) | Typical formulae |
|---|---|---|
| 1:12 | $P^{5+}$, $As^{5+}$, $Si^{4+}$, $Ge^{4+}$, $Ti^{4+}$, $Zr^{4+}$ | $[X^{n+}W_{12}O_{40}]^{-8+n}$ |
| 1:11 | $P^{5+}$, $As^{5+}$, $Ge^{4+}$, $Fe^{3+}$ | $[X^{n+}W_{11}O_{42}]^{-12+n}$ |
| 1:6 | $Te^{6+}$, $I^{7+}$ | $[X^{n+}W_6O_{24}]^{-12+n}$ |
| 2:12 | $Co^{3+}$, $Ac^{3+}$, $Cr^{3+}$, $Fe^{3+}$, $Rh^{3+}$ | $[X^{n+}W_{12}O_{42}]^{-12+2n}$ |

We prefer the acids in which the number ratio of the central atom to the characteristic atom of the complexing anion is 1:12, as these acids crystallize easily and are readily obtainable in a pure condition. Acids in which the ratio is different are more difficult to prepare in a pure condition and are frequently contaminated with the simple acid or anhydride which, in many circumstances, deactivates the complex heteropolybasic acid.

We have obtained consistently good results employing the 12-tungstohetero-acids, particularly 12-tungstophosphoric acid.

The peroxide is chosen from the classes (i) hydrogen peroxide, preferably in concentrated aqueous solution (greater than 50 percent w./w.) (ii) "ketone peroxides" that is 1-hydroxycycloalkyl hydroperoxides and bis- and tris-(1-hydroxycycloalkyl) peroxides for example 1-hydroxycyclohexyl hydroperoxide and its polymers, the equilibrium mixture being known as "cyclohexanone peroxide."

The residues of these ketone peroxides, after reaction with the ketone, are capable of being reformed into peroxides in known manner, thereby avoiding the necessity of accumulating a by-product.

The preferred peroxide is that of the ketone to be oxidised for, in this case, the residue is the same ketone and may be recycled as such in the process. For example, cyclohexanone peroxide made by the reaction of cyclohexanone and hydrogen peroxide or the liquid phase oxidation of cyclohexanol with molecular oxygen, may be employed in the oxidation of cyclohexanone to 6-hydroxycaproic acid and its esterified derivatives, the residue of the peroxide being cyclohexanone.

We have found that water interferes with the reaction and, in terms only of the conversion of peroxide to α,ω-hydroxy acid, that it is best to conduct the reaction in strictly anhydrous conditions, even to the extent of removing the water formed, during the reaction. However, we have frequently observed that dehydrating the reaction mixture in the course of the reaction encourages the self-condensation of the ketone in a side reaction evolving water. Merely avoiding disiccant conditions and allowing the water of reaction to accumulate to an equilibrium proportion of the reaction mixture is sufficient to suppress the side reaction. The equilibrium proportion amounts to a mole of water per mole of peroxide decomposed and this proportion does not have a marked effect on the yield of α,ω-hydroxy acid. The process can be operated continuously without allowing the proportion of water to increase significantly above the equilibrium proportion by passing the reaction mixture through serially connected reactors, from the last of which it emerges in a spent condition. The spent reaction mixture may then be worked up for the recovery of the product, the excess ketone and the residue of the peroxide, if this is different from the ketone, the water being rejected at this stage. Alternatively, the reaction may be made to move in plug flow through a pipe, the spent mixture issuing from the pipe being worked up as before.

It is also possible to reduce the incidence of ketone polymer by attention to the sub-combination of reactants made before the complete reaction mixture is formed. For example, we have found that heating the undiluted solution of the free acid catalyst in the ketone encourages self-condensation of the ketone. To overcome this, we prefer to form a substatnially stable liquid solution of the free acid in a part of the reactants and to add the solution to the alicyclic ketone or balance thereof, maintained at a temperature of at least 80° C. and preferably 100° C. and, if necessary, adding the peroxide or the balance thereof. When the peroxide is the solvent for the acid in making the stable solution, it is necessary that the temperature of the solution should be less than that at which the acid catalyses the decomposition of the peroxide and we prefer that the temperature of the solution should not exceed 30° C. If the same limitation on temperature is observed, it is possible to dilute the peroxide/acid solution with a portion of the ketone and to add this substantially stable ternary solution to the balance of the ketone heated to a temperature of at least 80° C. Alternatively, the acid may be dissolved in a part of the alicyclic ketone. In this case, the solution is substantially stable at temperatures up to 70° C., and the peroxide may be added simultaneously with the solution to the balance of the heated ketone.

The interference of water formed in the process and the less active interference of other hydroxylic compounds, such as alcohols, with the main reaction, can be suppressed by an excess of the ketone and we prefer to employ at least 10 moles of the ketone for each equivalent of peroxide. This excess of ketone is particularly important when the preferred peroxides, namely the ketone peroxides, are employed. The preferred method of making these peroxides is the liquid phase oxidation of an alicyclic alcohol with molecular oxygen. The terminal condition of this reaction occurs when a metastable equilibrium is established in the rate of production and the rate of break down of peroxides. For example, this equilibrium in the oxidation of cyclohexanol is established when the alcohol contains about 22 percent of cyclohexanone peroxide. To avoid the accumulation of the products of decomposition of the peroxide, we prefer to stop the reaction when the peroxide content attains at most 18 percent and preferably only 15 percent concentration in the cyclic alcohol. The peroxide, is, therefore, used in the form of a solution in the alcohol which itself may interfere with reaction, but the considerable excess of the ketone dilutes the alcohol and lessens its effect.

Whenever an alcohol is employed in the reaction mixture a porportion of α,ω-hydroxy acid is recovered in the form of its ester of the alcohol.

We have prepared cyclohexanone peroxide by the liquid phase oxidation of cyclohexanol with molecular oxygen by the process described by Brown in the J.A.C.S. article referred to earlier. Occasionally, we have added calcium carbonate to the reaction mixture, as suggested in the article, to improve the yield. Peroxides made in this way, containing calcium ions, are less efficient than peroxides free of metal ions, in oxidising the ketone in the process of this invention. The prolonged reaction times and lower yields of α,ω-hydroxy acids and derivatives, were similar to those occurring in reactions in the presence of too much water, or a decreased proportion of catalyst, and we interpret the interference of water and that of metal ions similarly as deactivation of the catalyst, in the latter case by salt formation. It is for this reason that the catalyst is specified as being a *free* acid catalyst.

The reaction involves all three species of compounds present in the reaction mixture, namely the peroxide, the ketone and the acid catalyst. This applies even when the peroxide is a ketone peroxide, although this material is itself capable of simple rearrangement to an α,ω-hydroxy acid under other conditions. In support of this statement, we have noted:

(i) The increased yield and more rapid reaction accompanying an increase in the ratio of the ketone to the peroxide, (ii) When the ketone peroxide is employed in the oxidation of a different ketone, the oxidation product of the latter predominates in the spent reaction mixture; for example, a reaction involving cyclohexanone peroxide and cyclopentanone mainly yields 5-hydroxyvaleric acid.

(iii) The rate of reaction changes with the ketone, for example cyclohexanone is oxidised more rapidly than cyclopentanone—this kind of difference is noted in the classical Baeyer-Villiger oxidation employing a peracid, where it is known that the peracid reacts with the ketone.

Taking into account these observations, the most likely reaction mechanism is that the peroxide and the heteropolybasic acid form a peroxide intermediate which oxidises the ketone.

The reaction is preferably carried out at a temperature of at least 80° C. and preferably at from 100° to 130° C., as exemplified in the following examples where parts and percentages are by weight unless otherwise stated.

EXAMPLE 1

A solution of 12-tungstophosphoric acid (0.15 g.) in dry cyclohexanone (50 g., 0.15 mole) was heated to 100° C. and cyclohexanone peroxide dissolved in cyclohexanol (50 g. containing 65.5 millimoles of peroxide) was added drop-wise with agitation whilst maintaining a temperature at 100° C. Heating was continued until more than 95 percent of the peroxides had decomposed as determined by iodometric titration; 80 minutes were required and the solution had by then developed a deep red colour.

The product was analysed by gas-chromatography for cyclohexanol and cyclohexanone. It was found that no cyclohexanone had formed during the reaction. 6-hydroxycaproic acid and adipic acid were determined by a separate gas-chromatographic analysis after first being converted to methyl 6-acetoxycaproate and dimethyl adipate respectively. This analysis showed the presence of 53.0 millimoles of 6-hydroxycaproic acid (81 percent conversion based on cyclohexanone peroxide) and 6 millimoles of adipic acid.

The reaction was repeated under similar conditions but with varying amounts of water added to the cyclohexanone solvent and including a run in which the cyclohexanone was replaced by water. The results of these experiments are presented in the following Table I:

TABLE I

| Cyclohexanone (g.) | Water (g.) | Duration (hrs.) for 95% decomposition of peroxides | Hydroxycaproic acid derivatives | | Adipic acid millimoles | Cyclohexanone formed (millimoles) | Colour of solution |
| --- | --- | --- | --- | --- | --- | --- | --- |
| | | | millimoles | percent conversion | | | |
| 50 | Nil | 1.3 | 53 | 81 | 6 | Nil | Deep red. |
| 50 | 1.0 | 3.0 | 38 | 58 | 4 | 5 | Pale red. |
| 50 | 5.0 | 5.0 | 24 | 37 | 6 | 26 | Pale yellow. |
| 50 | 10.0 | 6.5 | 26 | 40 | 7 | 44 | Do. |
| 50 | 25.0 | 7.5 | 15 | 23 | 7 | 53 | Do. |
| Nil | 50.0 | 5.0 | Nil | | Nil | 89 | Colourless. |

EXAMPLE 2

The procedure of Example 1 was repeated with varying ratios of cyclohexanone to cyclohexanone peroxides; the weight of 12-tungstophosphoric acid was 0.15 gram in each case. No cyclohexanone was formed in any of these trials the other pertinent results of which are recorded in the immediately following Table II:

TABLE II

| Cyclohexanone (g.) | Cyclohexanol hydroperoxide (millimoles) | Duration (min.) for 95% decomposition of peroxides | Hydroxycaproic acid derivatives | |
| --- | --- | --- | --- | --- |
| | | | Millimoles | Percent conversion |
| 25 | 46.5 | 60 | 18 | 39 |
| 50 | 47.5 | 75 | 36 | 76 |
| 100 | 46.5 | 80 | 42 | 90 |
| 150 | 49.0 | 60 | 47 | 96 |

To demonstrate the fact that it is the ketone (cyclohexanone) which is oxidised by the peroxides to form the $\alpha,\omega$-hydroxy acid rather than the hydroxy acid being formed by the simple decomposition of the peroxides dissolved in the ketone, the following experiment was carried out. 12-tungstophosphoric acid (0.15 g.) was dissolved in cyclopentanone (50 g., 0.595 mole) and the solution heated to 100° C. Cyclohexanone peroxide solution (50 g. containing 49.0 millimoles of peroxides) was added and heating was maintained until 95 percent of the peroxides had decomposed; 70 minutes were required. The product contained 27 millimoles of hydroxyvaleric acid derivatives (55 percent conversion based on cyclohexanone peroxide) and 10 millimoles of hydroxycaproic acid (20 percent conversion). No adipic acid was obtained.

It will be seen that the preponderant product can only result from the oxidation of the ketone, cyclopentanone.

EXAMPLE 3

The procedure of Example 1 was carried out in a reactor illustrated schematically in the accompanying drawing. Referring to the drawing, a reaction vessel 1 is equipped with a fractionating column 2, and a recirculation line 3 embodying a pump 4 and heat exchanger 5. The recirculation line 3 has side pipes 6 and 7 for the injection of liquids. The head of the fractionating column 2 communicates with a condenser 8 via line 9. From the condenser 8, a condensate line 10 communicates with a separator 11 which has two effluent lines, an upper recycle line 12 communicating with the head of the column 2 and a waste line 13 extending from the base of the separator and shaped to provide a waste liquid seal. An extractor line 14 extending from the condenser incorporates a pressure control valve 15 and a pump 16 for reducing the pressure in the apparatus; the pressure control valve 15 is arranged to be controlled by a temperature probe 17 within the reaction vessel 1. A storage vessel 18 is connected via a sump line 19 with the reaction vessel 1.

For the trial, the reaction vessel 1 was charged with a 0.3 percent by weight solution of 12-tungstophosphoric acid in cyclohexanone which was heated to 100° C. The addition of the cyclohexanone solution of the peroxides (131 millimoles of peroxides per 100 g. of solution) was commenced through the side pipe 6 at the same time as the pumps 4 and 16 were started, so that the peroxide solution was well-mixed with the heated catalyst solution, and the pressure in the apparatus was reduced to about 200 mm. Hg, the exact value being controlled by the valve 15 in response to the probe 17.

Within a short time, the exothermic reaction was able to sustain the temperature of 100° C. and the external heating was removed. Simultaneously the feed of more catalyst solution (12-tungstophosphoric acid in cyclohexanone) was commenced through side pipe 7.

A reaction temperature of approximately 100° C. was maintained with the assistance of the heat exchanger and the pressure in the apparatus dictated by the pump 16 in response to the probe. By this time the water formed in the reaction between the peroxides and cyclohexanone was present in sufficient quantities to form an azeotrope with cyclohexanone which boiled at about 60° C. at 200 mm. Hg.

The azeotrope passed from the fractionating column to the condenser and, from there, as a liquid, to the separator where it divided into a lower aqueous layer which was intermittently eliminated through the waste pipe, and an upper layer, rich in cyclohexanone, which was returned to the column through the recycle line.

The apparatus was operated for 3 hours under steady-running conditions, during which time spent reaction mixture was exhausted from the reaction vessel 1 through the sump line to the storage vessel, at the same rate as the fresh reactants were fed into the reaction vessel. Analysis of the spent solution in the storage vessel showed that the conversion of peroxides to 6-hydroxycaproic acid was 92 percent, the solution also contained 1.1 percent of cyclohexanone dimer.

EXAMPLE 4

A solution of cyclohexanone peroxide in cyclohexanol (50.0 g. containing 49.1 millimoles of peroxide) was added with agitation to a solution of 12-tungstophosphoric acid (0.15 g.) in cyclohexanone (50.0 g.) at 100° C. After 1.0 hour 97 percent of the peroxide had decomposed. The resulting solution was analysed by gas liquid chromatography, and found to contain 42.8 millimoles of 6-hydroxycaproic acid and 4.1 millimoles of adipic acid derivatives. Thus the conversion to 6-hydroxycaproic acid based on peroxides was 87 percent. The molar ratio of hydroxycaproic acid to adipic acid was 10.4:1.

Repeating this experiment with ammonium 12-tungstophosphate in place of the 12-tungstophosphoric acid, gave a yield of 6-hydroxycaproic acid which amounted to 34 percent conversion of peroxide. A decomposition with no acid catalyst gave a yield of 6-hydroxycaproic acid which amounted to 38 percent conversion of the peroxide.

EXAMPLE 5

12-tungstophosphoric acid (0.15 g.) was dissolved in 10.0 g. of cyclohexanone (by analysis 0.099 mole) and 50.0 g. of cyclohexanone peroxide (containing by analysis 0.0535 mole of peroxide and 0.023 mole of cyclohexanone) at ambient temperature. This solution was added to 40.0 g. of cyclohexanone (by analysis 0.394 mole) maintained at 100° C. Heating was continued for 60 minutes by which time more than 95 percent of the peroxide had decomposed. Analysis of the reaction mixture gave the following results:

|  | Percent w./w. | Mole |
|---|---|---|
| Cyclohexanol | 37.4 | 0.373 |
| Cyclohexanone | 52.8 | 0.539 |
| Cyclohexanone dimer | 0.07 | 0.0004 |
| Hydroxycaproic acid derivatives | 5.6 | 0.0424 |
| Adipic acid | 0.30 | 0.0021 |
| Adipaldehydic acid | 0.14 | 0.0011 |

The conversion of peroxide to hydroxycaproic acid derivatives was 79 percent. Very little cyclohexanone dimer was formed, but there was a significant increase in cyclohexanone monomer content, corresponding to a conversion of cyclohexanone peroxide of 20.5 percent.

EXAMPLE 6

Commercial cyclohexanone peroxide (7.74 gm.) was dissolved in cyclohexanol (774 gm.) in a creased flask equipped with a stirrer, an inlet for oxygen, a water-cooled condenser and an electric heating mantle. A slow stream of oxygen was admitted to the flask below the level of solution was rapidly stirred at a temperature of 120° C. This temperature was maintained for three hours, then for a further three hours the temperature was kept at 100° C. The oxidation was completed at a temperature of 95° C. over a period of four hours. Analysis showed that the peroxide solution contained 0.127 mole of peroxide per 100 gm. of solution.

The solution (50 gm. 0.0635 mole peroxide), substantially free of metal ions, was mixed at ambient temperature with cyclohexanone (10 gm.) containing dissolved 12-tungstophosphoric acid (0.15 gm.). The combined solutions were added drop-wise over 30 minutes, with stirring, to cyclohexanone (40 gm.) heated to 100° C. The temperature was maintained until more than 95 percent of the peroxide had decomposed. Intermediate analysis of the reaction mixture showed that 40 minutes after the addition of the combined solutions 93 percent by weight of the peroxides had decomposed and after 60 minutes the decomposition was 97 percent complete. At this stage gas/liquid chromatography showed that the mixture contained 6.55 percent (0.0496 mole) of hydroxycaproic acid corresponding to a conversion of the peroxides of 78 percent.

When calcium carbonate is present during the oxidation of cyclohexanol, the eventual solution of peroxide contains up to 100 p.p.m. of soluble calcium probably present as calcium adipate. To allow a strict demonstration of the influence of polyvalent metal ions on the course of the reaction involving cyclohexanone, calcium adipate was dissolved in the otherwise metal-free peroxide solution prepared as above, so that the calcium content of the solution was 87 p.p.m. The remaining steps in the process (dissolution in cyclohexanone containing 12-tungstophosphoric acid and addition to hot cyclohexanone) were identical with those exemplifying the invention. Intermediate analysis of the reaction mixture showed the following rate of decomposition of the peroxides (the times refer to the interval following the formation of the final reaction mixture).

| Minutes at 100° C.: | Percent peroxide decomposed |
|---|---|
| 40 | 32.5 |
| 60 | 64 |
| 160 | 92 |
| 240 | 97 |

The product was shown to contain 3.95 percent of hydroxycaproic acid derivatives (0.0299 mole) corresponding to a 47 percent conversion of peroxide.

From these data it appears that, in the absence of polyvalent metal ions, the oxidation of cyclohexanone with peroxide catalysed by a heteropolyacid, is both more rapid and more productive of $\alpha,\omega$-hydroxy acids and esterified derivatives thereof.

EXAMPLE 7

The details of a trial carried out in the manner described in Example 1 are set out in column A of the following table, the details in the remaining columns demonstrating the infence of water, and one (F), an uncatalysed reaction:

| Trial No. | A | B | C | D | E | F |
|---|---|---|---|---|---|---|
| 12-tungstophosphoric acid (percent w./w.) | 0.15 | 0.15 | 0.15 | 0.15 | 0.15 | |
| Time for 95% peroxide decomposition | 1.2 | 3.0 | 5.0 | 6.5 | 7.5 | 8 |
| Water (m./m. of peroxide) | Nil | 0.85 | 4.2 | 8.5 | 21.2 | |
| Cyclohexanone (m./m. of peroxide) | 7.7 | 7.7 | 7.7 | 7.7 | 7.7 | 10.5 |
| Products (m./m. of peroxide): | | | | | | |
| 6-hydroxycaproic acid | 0.81 | 0.57 | 0.36 | 0.39 | 0.23 | 0.38 |
| Adipic acid | 0.09 | 0.06 | 0.09 | 0.11 | 0.11 | 0.12 |
| Adipaldehydic acid | 0.04 | 0.03 | 0.04 | 0.05 | 0.13 | 0.09 |

It will be noted that as the water content is increased, (i) the rate of peroxide decomposition decreases,
(ii) the production of 6-hydroxycaproic acid and derivatives decreases, and
(iii) the production of adipic and adipaldehydic acid tends to increase.

The same changes are brought about by omitting the catalyst.

EXAMPLE 8

A reaction solution was prepared at ambient temperature from reactants in the following proportions:

| Heteropolybasic acid | Period for 95% decomposition (minutes) | Hydroxycaproic acid and derivatives | Adipic and adipaldehydic acid | Cyclohexanone dimer (percent) |
|---|---|---|---|---|
| 12-tungstophosphoric acid | 25 | 94 | 3 | 0.40 |
| 9-tungstophosphoric acid (dimeric) | 25 | 70 | 4 | 0.42 |
| 21-tungsto 2 phosphoric acid | 45 | 57 | 5 | 0.15 |
| 12-tungstoboric acid | 30 | 75 | | |
| 12-tungstozincic acid | 30 | 53 | 7 | 0.40 |
| 12-tungstoaluminic acid | 20 | 80 | 7 | 0.43 |
| 11-tungstophosphoric acid (dimeric) | 25 | 74 | 1 | 0.40 |
| 12-tungstasilicic acid | 20 | 75 | 3.5 | 0.34 |
| 12-tungstoarsenic acid | 20 | 80 | 2 | 0.36 |
| Tungstovanadic acid | 20 | 74 | 4 | 0.16 |
| 12-tungstoferric acid | 20 | 66 | 4.5 | 0.32 |
| 12-tungstocobaltous acid | 25 | 56 | 5 | 0.42 |
| 12-tungstoarsenious acid | 25 | 54 | | 0.50 |
| Tungstovanadophosphoric acid | 20 | 53 | 3 | 0.24 |
| Tungstovanadoboric acid | 20 | 44 | 3 | 0.31 |
| Tungstovanadoarsenic acid | 20 | 44 | 3.5 | 0.28 |
| 12-molybdophosphoric acid | 20 | 44.5 | 1 | 0.15 |

Cyclohexanone—100 g. (1.02 mole)
Cyclohexanone peroxide in cyclohexanol—50 g. (0.0575 mole peroxide)
12-tungstophosphoric acid—0.225 g.

This solution was fed by a micropump to the base of a glass spiral reactor heated in a vapour bath to a temperature of 124° C. The volume of the reactor was 12 ml. and the pumping rate was controlled to give a residence time in the reactor of 10 minutes. The spent reaction mixture leaving the top of the spiral reactor was cooled in passing through a water-cooled tube to a receiver. After steady-running conditions had been established the liquid leaving the reactor was analysed: it contained Hydroxycaproic acid and derivatives—4.1 percent w./w. (81 percent conversion of peroxide)
Adipic acid—0.2 percent
Adipaldehydic acid—0.1 percent
Cyclohexanone—66 percent

EXAMPLE 9

12-tungstophosphoric acid (0.15 g.) was dissolved in cyclohexanone (50 g.) and the solution heated to 100° C. Hydrogen peroxide solution (84.8 percent w./w., 2.70 g., 0.0675 mole peroxide) was added drop-wise over a period of 10 minutes. The reaction was strongly exothermic and cooling was necessary to maintain the temperature at 100° C. Analysis, 15 minutes after completing the addition of the peroxide, showed that 99 percent of the peroxide had decomposed. The reaction mixture was also found to contain:

Hydroxycaproic acid and derivatives—12.5 percent w./w. (74 percent conversion of peroxide)
Adipic acid—trace
Adipaldehydic acid—0.1 percent
Cyclohexanone—75.5 percent

EXAMPLE 10

A standard procedure was used to examine the efficiency of individual heteropolybasic acids. The heteropolybasic acid (0.15 g.) was dissolved in cyclohexanone (10 g.) and cyclohexanone peroxide contained in cyclohexanol (50 g., containing 7.5 g. peroxide). This solution was added, over 20 minutes, to cyclohexanone (40 g.) heated to 100° C. The temperature was maintained until 95 percent of the peroxide had decomposed. The following table identifies the individual heteropolybasic acids and the analysis of the corresponding spent reaction mixtures, together with the periods required to achieve the necessary degree of decomposition of the peroxide.

What we claim is:

1. In a process for making ω-hydroxy carboxylic acids by the peroxide oxidation of a cyclic ketone having from 4 to 17 carbon atoms, the improvement which comprises forming a solution of a free polybasic acid catalyst formed by the union of $WO_3$, $MoO_3$ or $V_2O_5$ with an acid whose anion is characterized by the presence of trivalent iron, cobalt, actinium, chromium or rhodium; tetravalent silicon, germanium, titanium or zirconium; pentavalent phosphorous or arsenic; hexavalent tellurium or heptavalent iodine, in a mixture of hydrogen peroxide or a ketone peroxide and the cyclic ketone to be oxidized, and heating said mixture at a temperature of at least 80° C., the proportion of ketone to peroxide being at least 10 to 1 and the reactants being maintained free from water in excess of that provided by decomposition of the peroxide.

2. The process claimed in claim 1 wherein the peroxide is a ketone peroxide whose ketone residue is similar to the cyclic ketone to be oxidized.

3. A process as claimed in claim 1 in which the catalyst is a heteropolytungstic acid.

4. A process as claimed in claim 3 in which the catalyst is a hetero-12-tungstic acid.

5. A process as claimed in claim 4 in which the catalyst is 12-tungstophosphoric acid.

6. A process for the manufacture of 6-hydroxy caproic acid which comprises heating to at least 80° C. a substantially anhydrous solution of cyclohexanone peroxide and 12-tungstophosphoric acid in an excess of cyclohexanone in which the molar ratio of cyclohexanone to cyclohexanone peroxide is at least 10:1.

7. A process as claimed in claim 6 in which the temperature is between 100° and 130° C.

References Cited

UNITED STATES PATENTS

| | | | |
|---|---|---|---|
| 2,744,928 | 5/1956 | Smith | 260—530 |
| 2,828,338 | 3/1958 | Lavigne | 260—535 |
| 2,904,584 | 9/1959 | Payne et al. | 260—535X |
| 3,190,913 | 6/1965 | Fetterly et al. | 260—533 |

FOREIGN PATENTS

| | | | |
|---|---|---|---|
| 935,029 | 8/1963 | Great Britain | 260—535 |
| 990,639 | 4/1965 | Great Britain | 260—533 |

LORRAINE A. WEINBERGER, Primary Examiner

P. J. KILLOS, Assistant Examiner

U.S. Cl. X.R.

260—343, 343.5, 343.6, 484, 485, 530, 537